United States Patent
Foss et al.

(10) Patent No.: US 9,782,037 B2
(45) Date of Patent: Oct. 10, 2017

(54) HANGING ROASTER DEVICE AND METHOD

(71) Applicant: Williams-Sonoma, Inc., San Francisco, CA (US)

(72) Inventors: Michelle Foss, San Francisco, CA (US); Ian Allan, Corte Madera, CA (US); Peter Degnan, El Cerrito, CA (US); Philip Rose, San Francisco, CA (US); Ryan Peloquin, Seattle, WA (US); Matthew Frank, Seattle, WA (US)

(73) Assignee: Williams-Sonoma, Inc., San Francisco, CA (US)

( * ) Notice: Subject to any disclaimer, the term of this patent is extended or adjusted under 35 U.S.C. 154(b) by 0 days.

(21) Appl. No.: 14/665,759

(22) Filed: Mar. 23, 2015

(65) Prior Publication Data
US 2015/0265096 A1    Sep. 24, 2015

Related U.S. Application Data

(60) Provisional application No. 61/968,626, filed on Mar. 21, 2014.

(51) Int. Cl.
*A47J 43/18*    (2006.01)
*A47J 37/04*    (2006.01)
*A22C 17/00*   (2006.01)

(52) U.S. Cl.
CPC .......... *A47J 37/049* (2013.01); *A22C 17/006* (2013.01); *A47J 43/18* (2013.01)

(58) Field of Classification Search
CPC ............................... A47J 43/18; A22C 17/006

USPC ... 99/419, 426, 449, 421 A, 421 V, 345, 347
See application file for complete search history.

(56) References Cited

U.S. PATENT DOCUMENTS

| | | | |
|---|---|---|---|
| 2,826,982 A * | 3/1958 | Smith ................ | A47J 37/0763 126/30 |
| 4,094,414 A | 6/1978 | Thiot et al. | |
| 4,401,018 A | 8/1983 | Berry | |
| D280,065 S * | 8/1985 | Pierscinski ................ | D7/409 |
| 4,633,773 A | 1/1987 | Jay | |
| 4,738,192 A * | 4/1988 | Odom, Jr. ............. | A47J 43/18 248/175 |
| 5,069,117 A | 12/1991 | Schlessel | |
| 5,106,642 A | 4/1992 | Ciofalo | |
| 5,442,999 A | 8/1995 | Meister | |
| 5,791,235 A | 8/1998 | Anselmo | |

(Continued)

FOREIGN PATENT DOCUMENTS

WO    WO 2012/168044    12/2012

OTHER PUBLICATIONS

International Search Report and Written Opinion from PCT/US2015/022022 dated Jun. 25, 2015.

*Primary Examiner* — Reginald L Alexander
(74) *Attorney, Agent, or Firm* — Cook Alex Ltd.; R. Blake Johnston (57) ABSTRACT

A device for roasting a food item includes a stand having a frame adapted to be positioned on a surface of a cooking device. The frame includes an upper frame member. A food hanger is adapted to support the food item and engages the upper frame member in a removable fashion so that a majority of the food item is suspended below the upper frame member and above the surface of the cooking device when the frame is positioned thereon.

16 Claims, 10 Drawing Sheets

(56) References Cited

U.S. PATENT DOCUMENTS

| | | | |
|---|---|---|---|
| 6,016,744 A * | 1/2000 | Pritsker | A22C 21/0038 |
| | | | 426/132 |
| 6,427,582 B1 | 8/2002 | Measom | |
| 6,668,708 B1 | 12/2003 | Swinford | |
| 849,290 A1 | 4/2007 | Vanderbilt | |
| 7,237,476 B1 | 7/2007 | Bourgeois | |
| 7,350,458 B2 | 4/2008 | Leibowitz | |
| D612,693 S | 3/2010 | Accardo | |
| D633,335 S | 3/2011 | Groll | |
| 8,137,732 B2 | 3/2012 | Groll | |
| 8,156,861 B1 * | 4/2012 | Prokopow | A47J 43/18 |
| | | | 211/200 |
| 8,307,760 B2 | 11/2012 | Wong | |
| D690,168 S * | 9/2013 | Zemel | D7/637 |
| 8,621,988 B1 | 1/2014 | O'Dea | |
| 2005/0279223 A1 * | 12/2005 | McPeak | A47J 43/18 |
| | | | 99/419 |
| 2006/0266227 A1 | 11/2006 | Britt et al. | |
| 2013/0295258 A1 * | 11/2013 | Glas | A47J 37/0694 |
| | | | 426/523 |
| 2014/0165853 A1 | 6/2014 | Malone | |

\* cited by examiner

HANGING ROASTER DEVICE AND METHOD

CLAIM OF PRIORITY

This application claims the benefit of and priority from U.S. Provisional Patent Application Ser. No. 61/968,626, filed Mar. 21, 2014, the contents of which are hereby incorporated by reference.

FIELD OF THE INVENTION

The present invention relates generally to food preparation devices and methods and, in particular, to a hanging roaster device and method.

BACKGROUND

As the trend towards healthy eating by individuals continues, consumption of high protein food items such as chicken, turkey and other meats has risen. As a result, it has become desirable to improve upon the preparation of such foods so as provide more consistent and even roasting, greater moisture and tenderness and a reduction in the effort required of an individual during the cooking process. In addition, it is desirable to provide a generally uniform browning of the skin.

Food items such chicken, turkey and other meats come in a variety of shapes and sizes. As a result, a roasting device that accommodates food items of various sizes and shapes would provide greater versatility and ease of use. A roasting device that may easily receive and securely hold food items and that facilitates handling of the food item, both before and after roasting, would also be desirable.

A need exists for a roaster device and method that addresses at least some of the above issues.

DETAILED DESCRIPTION OF EMBODIMENTS

Figure 1A:
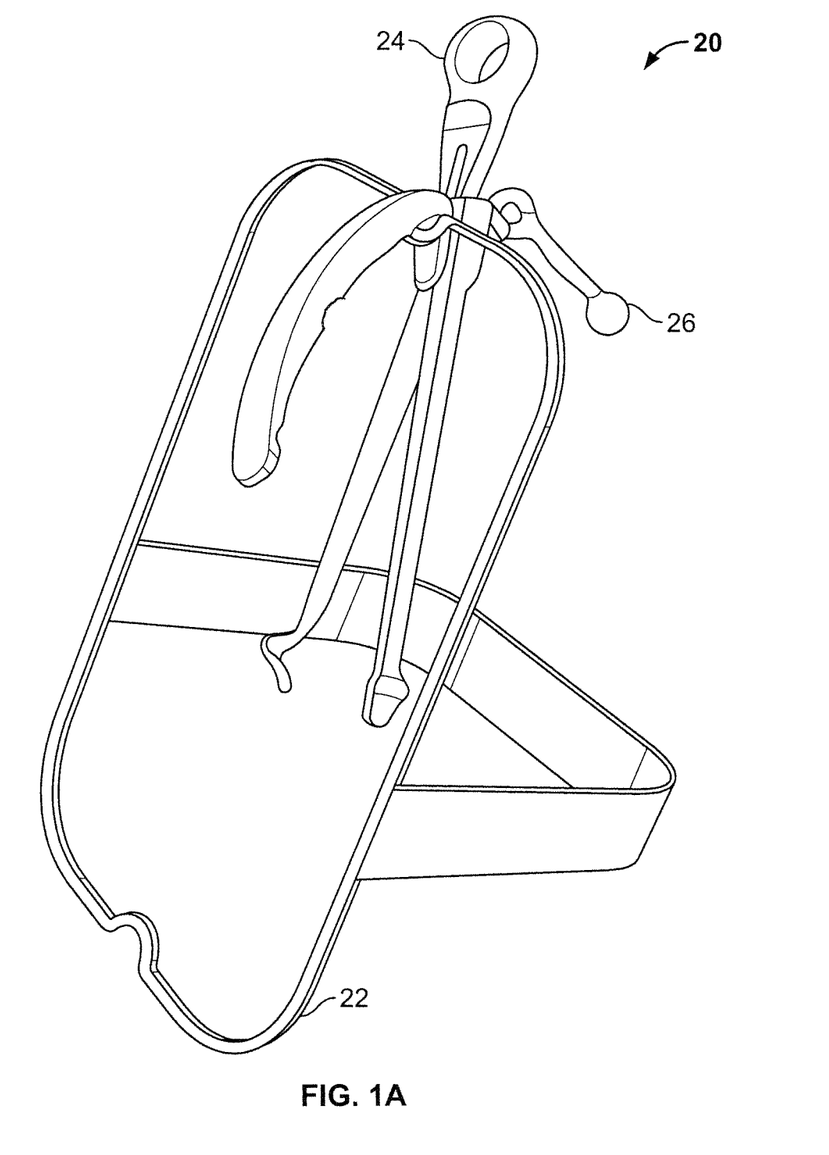
FIGS. 1A and 1B are perspective views of an embodiment of the hanging roaster device of the invention without and with a food item mounted thereon.
Figure 1B:
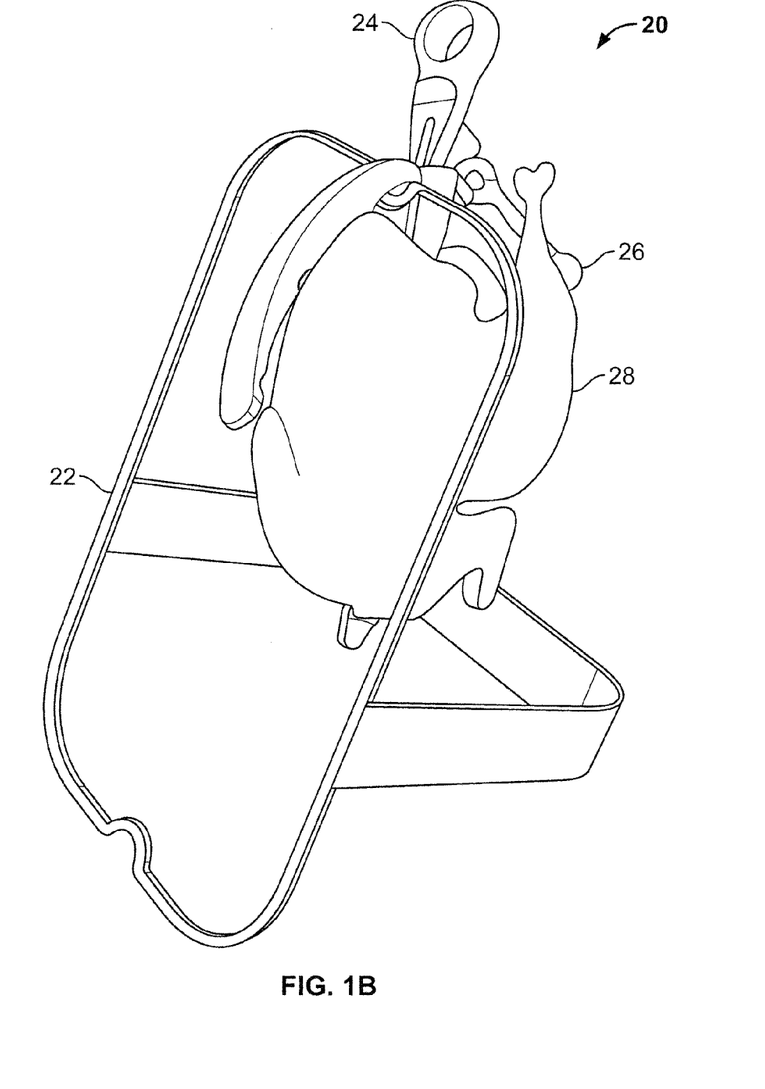
Figure 2:
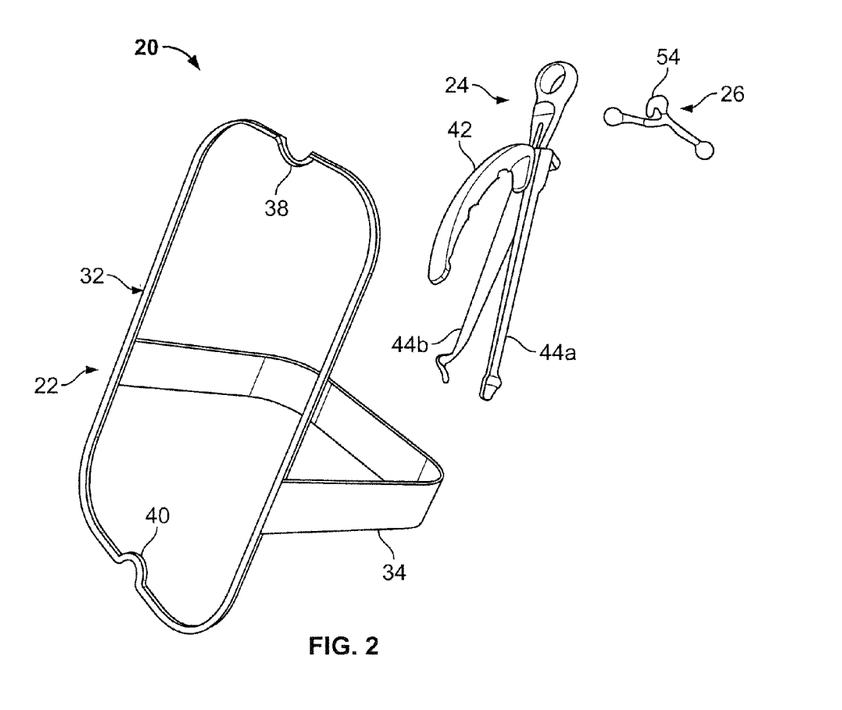
FIG. 2 is an exploded perspective view of the hanging roaster device of FIG. 1A.

An embodiment of the hanging roaster device of the invention is indicated in general at 20 in FIGS. 1A, 1B and 2. As best illustrated in FIGS. 1A and 2, the device features three main components: a stand 22, a food hanger or cavity tongs 24 and a leg retention rack 26. As illustrated in FIG. 1B, a food item, such as a whole chicken 28, is suspended from the stand 22 by the cavity tongs 24 and leg retention rack 26. The stand may be positioned within a stove or on a cooking surface, such as an outdoor grill, or on or within any other cooking device. As will be explained in greater detail below, this provides a unique and beneficial cooking style that is very user friendly.

While the invention is described below in terms of use in roasting a whole chicken, it may be used to roast other types of poultry and meats including, but not limited to, duck, turkey, lamb, pork and beef. In addition, the invention may be used to roast other types of foods including, but not limited to, vegetables.

Figure 3:
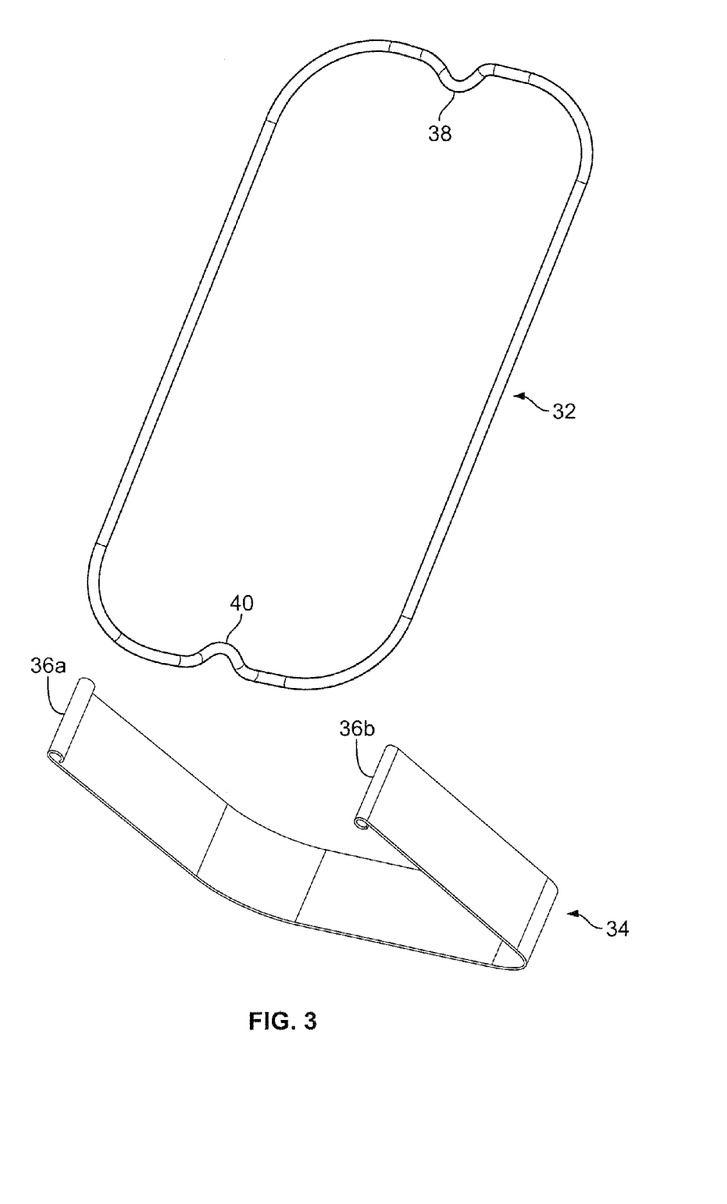
FIG. 3 is an exploded perspective view of the stand of the hanging roaster device of FIGS. 1A-2.
Figure 4A:
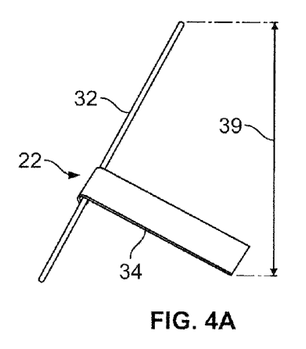
FIGS. 4A and 4B are side elevational and perspective views, respectively, of the stand of FIG. 3 configured for a higher roasting height.
Figure 4B:
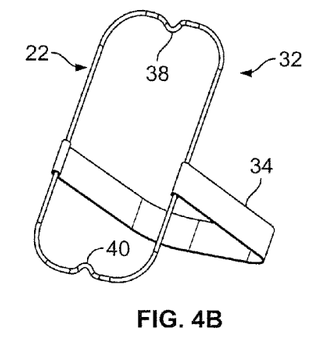
Figure 4C:
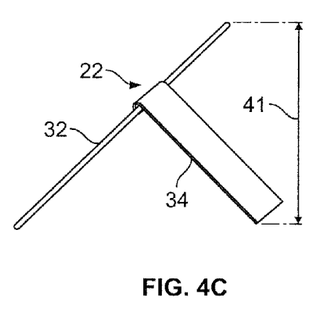
FIGS. 4C and 4D are side elevational and perspective views, respectively, of the stand of FIGS. 3, 4A and 4B oriented for a lower roasting height.
Figure 4D:
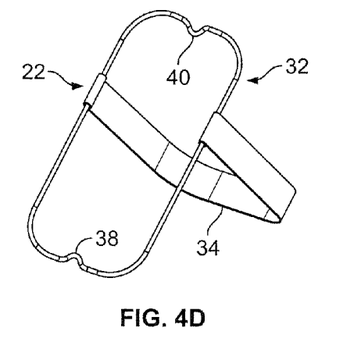

As illustrated in FIGS. 2 and 3, the stand 22 includes a frame, indicated in general at 32, and a support 34. As an example only, the frame may be formed from a piece of bent stainless steel wire (with the ends welded or soldered together), while the support may be formed from bent sheet metal. The support features a U-shape with a pair of sleeves 36a and 36b formed at each end that are secured to the frame, preferably in a fixed fashion. The frame includes a first generally horizontal frame member that includes a first hanging recess 38 and an opposing second generally horizontal frame member that includes second hanging recess 40 to engage and support the handle 42 of the cavity tongs. More specifically, as illustrated in FIGS. 4A and 4B, the stand 22 may be positioned in a first orientation with the first hanging recess 38 at the top to provide a tall stand height (indicated by arrows 39 of FIG. 4A) such as, as an example only, eleven inches. Alternatively, as illustrated in FIGS. 4C and 4D, the stand may be inverted with second hanging recess 40 at the top so as to be positioned in a second orientation to provide a low stand height (indicated by arrows 41 in FIG. 4C) such as, as an example only, an eight inch stand height. As a result, the stand may accommodate different oven and grill cover heights and different food item sizes.

In an alternative embodiment, the sleeves 36a and 36b of the support 34 may be sized to receive the wire frame 32 of the stand in an interference fit, but slidable fashion. As a result, the position of the support with respect to the frame may be adjusted in a sliding fashion to provide the stand with a continuously variable range of heights. Alternatively, a ratchet or toothed arrangement may be formed between the support and frame of the stand. In still another alternative embodiment, the support may be pivotally mounted to the frame. The frame could also fold flat for easy shipping and/or could be mounted (fixed or removably) to a tray or pan. The frame could also alternatively take the form of an A-frame or structure featuring triangular side frames or walls with a base side that rests on the cooking surface or oven bottom.

As noted previously, a pair of cavity tongs 24 are used to hang the food item from the frame 32. With reference to FIGS. 2 and 5A-6, the cavity tongs include a handle 42, a food support portion including a pair of arms 44a and 44b having grasping protrusions 46a and 46b positioned on distal ends thereof, and a tong operation tab 48. In addition, the cavity tongs may include a leg retention rack locator 52 which is a recess or loop that receives the hook 54 (FIGS. 2 and 7) of the leg retention rack 26, as will be described below. The arms 44a and 44b, including the grasping protrusions 46a and 46b, may be made from, as an example only, stainless steel, while the remaining components may be made from, again as an example only, cast aluminum/zinc (or similar). The handle 42 is preferably generally arc-shaped as illustrated.

Figure 5A:
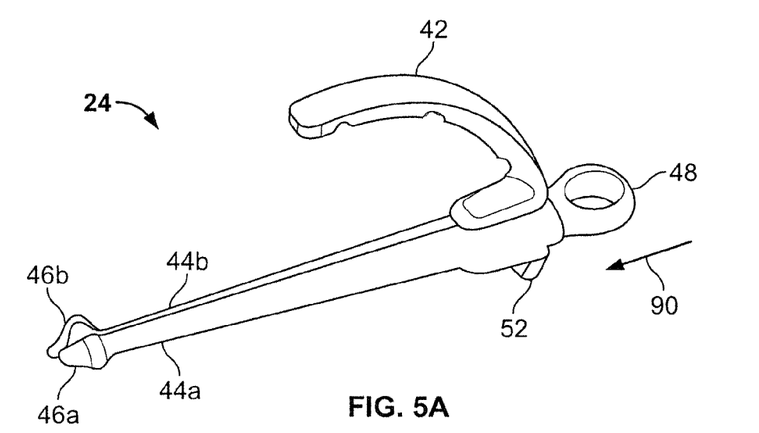
FIGS. 5A and 5B are perspective views of the cavity tongs in the closed and open configurations, respectively.
Figure 5B:
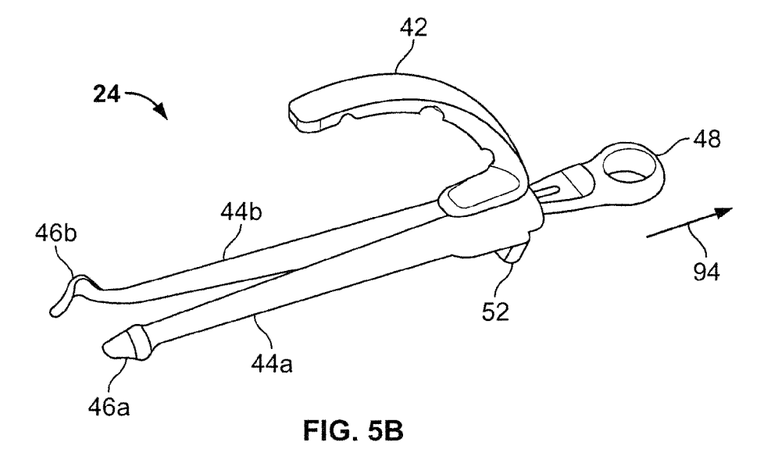

As illustrated in FIGS. 5A and 5B, respectively, the cavity tongs 24 may be configured with the arms 44a and 44b closed, for inserting the cavity tongs into and pulling the cavity tongs out of the food item, and the arms 44a and 44b open for retaining the food item on the tongs. The configuration of the tongs may be controlled via tong operation tab 48, which is pulled to open the arms (FIG. 5B) and pushed to close the arms (FIG. 5A).

Figure 6:
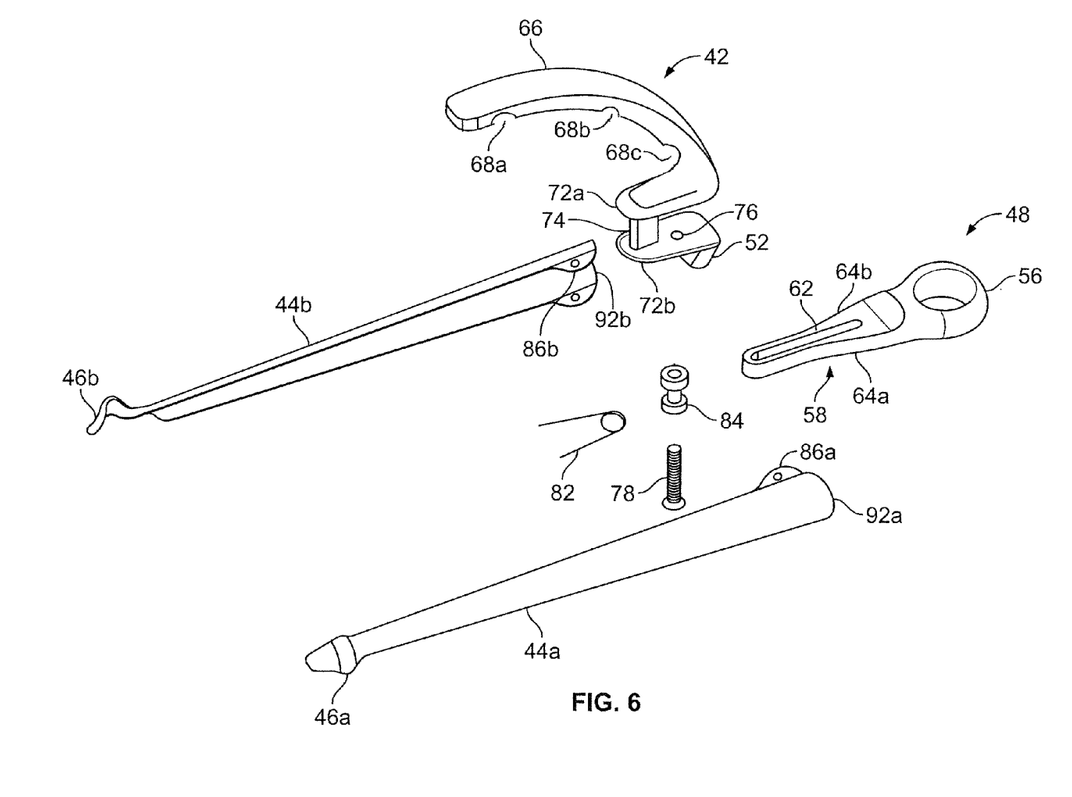
FIG. 6 is an exploded perspective view of the cavity tongs of FIGS. 5A and 5B.

An exploded view of the cavity tongs mechanism is provided in FIG. 6. The tong operation tab 48 includes a finger grip 56, which as illustrated may take the form of a loop for each of grasping by a user and to receive a leg support rack as described below, and a slider, indicated in general at 58. The slider includes an elongated slot 62 and a pair of tapered side edges 64a and 64b. As noted previously, the cavity tongs also include a handle, indicated in general at 42. The handle includes an arc-shaped gripping portion 66 with an undersurface featuring hanging angle locator cutouts 68a, 68b and 68c, the use of which will be explained below.

The gripping portion 66 of the handle may be formed from a variety of materials including, as examples only, molded plastic (shown), a strip of rigid or semi-rigid metal with the hanging angle locator cutouts formed therein or a wire form with the hanging angle locator cutouts formed therein.

The handle 42 also includes an opposing pair of base plates 72a and 72b joined in a spaced arrangement by slider tab 74. Base plate 72b features an opening 76 while base plate 72a features a bore on its inner surface (not shown), both of which are sized to be engaged by machine screw 78. A torsion spring 82 and bushings 84, which may be made of, as an example only, nylon, are positioned between the base plates 72a and 72b, as are hinge tabs 86a and 86b of arms 44a and 44b. The machine screw 78 is inserted through these components, as well as the elongated slots 62 of the slider of the operation tab 48, with slider 58 sandwiched between the bushings 84, after the screw is inserted through the opening 76 of base plate 72b. The slider tab 74 is also positioned through the elongated slot 62 of the slider 58. The distal end of the screw is then inserted into the corresponding bore formed in base plate 72a and tightened. As a result, the arms 44a and 44b are free to pivot between the closed position (FIG. 5A) and the open position (FIG. 5B). The torsion spring 82 urges the arms 44a and 44b into the open position illustrated in FIG. 5B.

The arms 44a and 44b may be secured in the closed configuration of FIG. 5A by pushing the operation tab 48 inward, as indicated by arrow 90 of FIG. 5A. When the operation tab 48 is in this position, the widest portion of the tapered side edges 64a and 64b of the slider 58 engage the proximal ends 92a and 92b (FIG. 6) of the arms to prevent the arms 44a and 44b from pivoting about screw 78 into the open configuration. The arms 44a and 44b may be placed in the open configuration of FIG. 5B by pulling the operation tab 48 outward, as indicated by arrow 94 of FIG. 5B. This causes the narrowed portion of the tapered side edges 64a and 64b of the slider 58 to be positioned adjacent to the proximal ends 92a and 92b so that the arms 44a and 44b pivot into the open configuration under the urging of spring 82.

Figure 7:
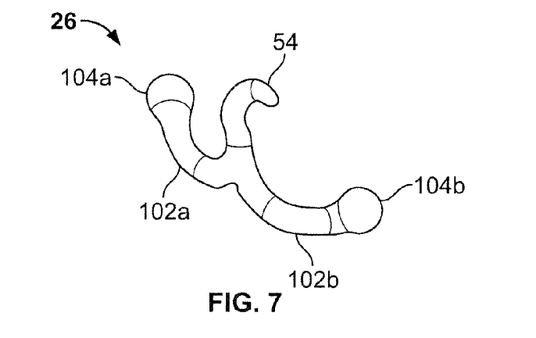
FIG. 7 is an enlarged perspective view of the leg retention rack of the hanging roaster device of FIGS. 1A-2.
Figure 8A:
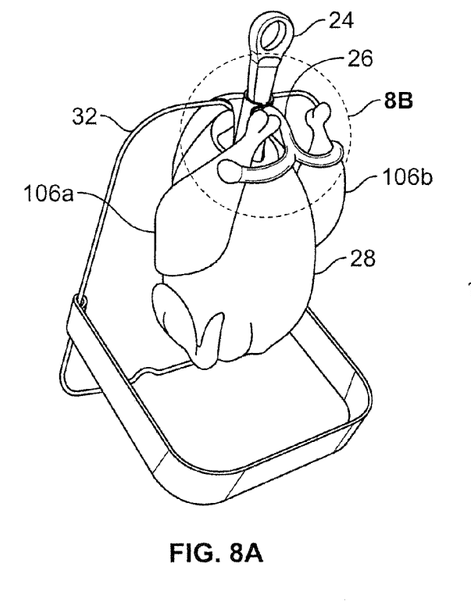
FIGS. 8A and 8B are perspective and enlarged partial perspective views, respectively, illustrating the leg retention rack of FIG. 7 in use with a poultry food item.
Figure 8B:
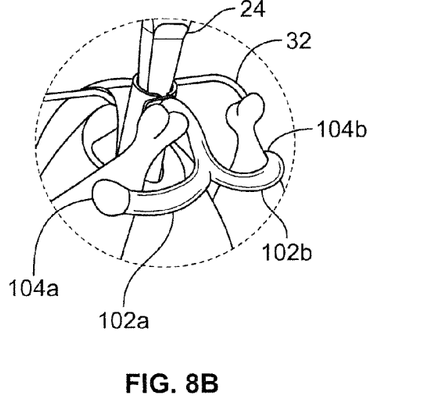

As illustrated in FIG. 7, the leg retention rack 26 includes a hook 54. The hook 54 engages the leg retention rack locator (which may be a loop or a recess), indicated at 52 in FIGS. 5A-6, so that the leg retention rack is secured to or hangs from the cavity tongs as illustrated in FIGS. 8A and 8B. In alternative embodiments, the hook 54 of the leg retention rack may engage the finger grip loop 56 (FIG. 6) so that the leg retention rack locator 52 may be omitted.

As illustrated in FIG. 7, the leg retention rack 26 includes a first leg support member 102a that terminates in knob 104a. The leg retention rack also includes a second leg support member 102b that terminates in knob 104b. Using chicken as an example of the food item 28, as illustrated in FIGS. 8A and 8B, the legs 106a and 106b of the chicken are supported by the leg support members 102a and 102b and the knobs 104a and 104b. This prevents the legs from sagging during the cooking process. This provides a more familiar looking roasted chicken, allowing the user to easily serve and carve. Of course leg retention racks of differing configurations and appearances may be used when the food item is not chicken.

Figure 9A:
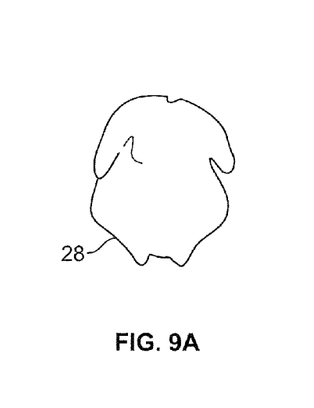
FIGS. 9A-9D are side elevational views illustrating use of the cavity tongs of FIGS. 5A-6 with a poultry food item.
Figure 9B:
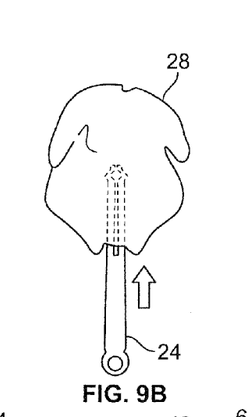
Figure 9C:
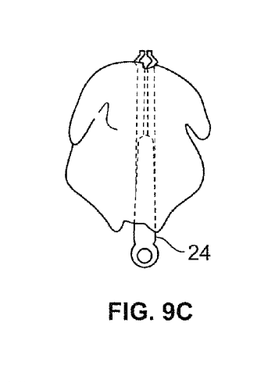
Figure 9D:
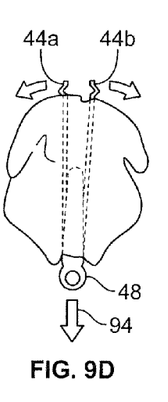

Insertion of the cavity tongs 24 into a food item 28 is illustrated in FIGS. 9A-9D. The cavity tongs are initially placed with the arms in the closed configuration (FIG. 5A) and are then inserted through a bottom opening of the food item (FIG. 9B). The tongs are then inserted through the cavity of the food item until they exit a second opening of the food item (FIG. 9C), such as the neck opening when the food item is a chicken. The tong operation tab 48 is then pulled outward, as illustrated by arrow 94 in FIG. 9D, and the tong arms 44a and 44b move into the open configuration (also illustrated in FIG. 5B). As a result, the cavity tongs 24 securely hold the food item with minimal surface contact, and minimally impact the overall height/length of the food item being roasted.

Figure 10A:
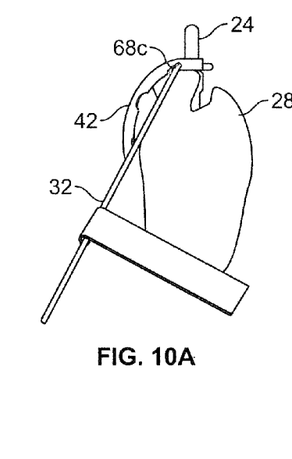
FIGS. 10A-10C are side elevational views illustrating positioning of the handle of the cavity tongs on the stand of the hanging roaster device of FIGS. 1A-9D in generally vertical, angled and horizontal orientations, respectively.
Figures 10B, 10C:
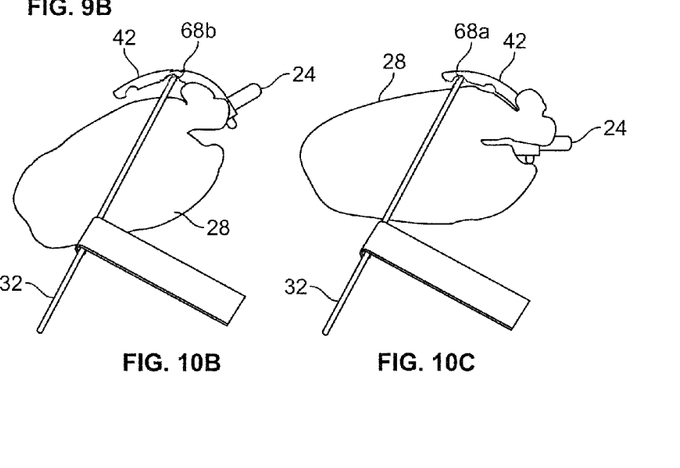

With reference to FIGS. 10A-10C, the handle 42 allows for easy moving and maneuvering of the food item positioned on the tongs and facilitates placing and removing the food item to and from the stand. In addition, the hanging angle locator cutouts 68a, 68b and 68c of the handle 42 permit the handle 24 to engage the top surface of the first or second generally horizontal frame member so as to be hung on the first hanging recess or second hanging recess (38 and 40 in FIGS. 2-4B) of the frame 32 of the stand at different handle locations, as illustrated in FIGS. 10A-10C, so as to change the orientation at which the food item 28 is suspended from the stand. This permits a range of chicken sizes to be accommodated. Using a chicken as an example of the food item 28, FIG. 10A illustrates a generally vertical orientation, which is best for small to medium-sized chickens. FIG. 10B illustrates an angled orientation, which works best for medium to large-sized chickens. FIG. 10C illustrates a generally horizontal orientation, which is best for large to oversized chickens.

Figure 11:
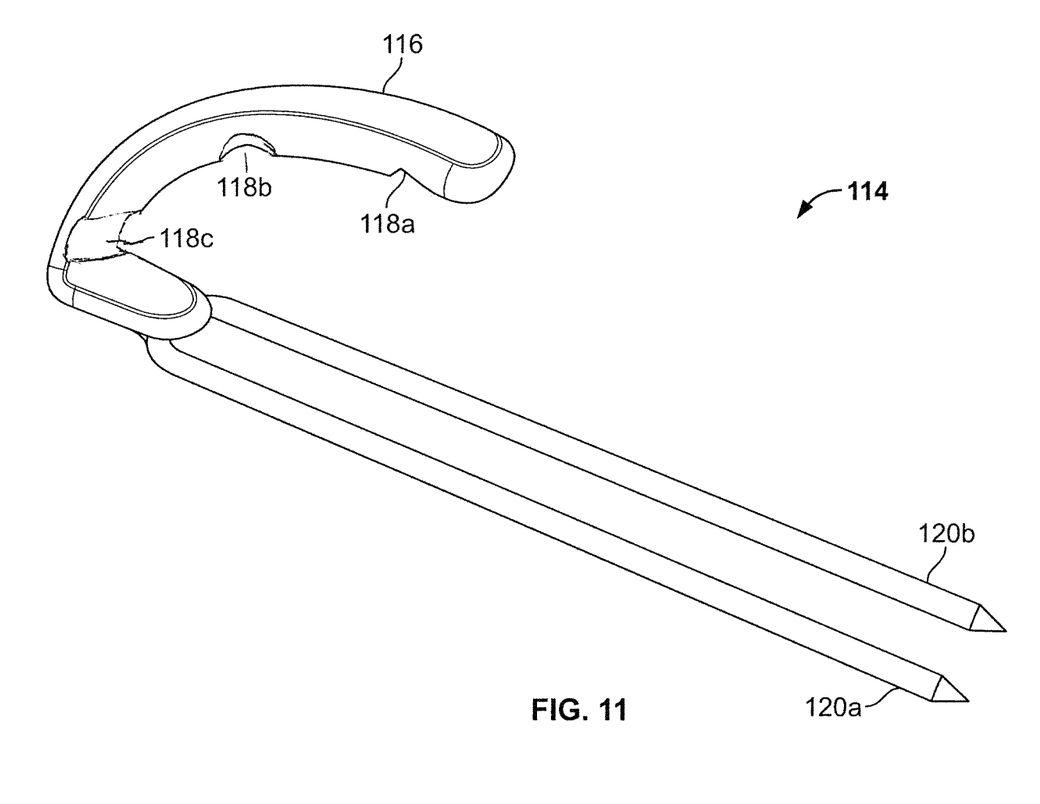
FIG. 11 is a perspective view of a skewer for use in an alternative embodiment of the hanging roaster device of the present invention.

In an alternative embodiment of the invention, a hanging skewer, indicated in general at 114 in FIG. 11, may be substituted for the cavity tongs (24 of FIGS. 5A and 5B) as the food hanger. The skewer 114 does not feature pivoting arms, but instead merely features, as the food support portion, a pair of pointed elongated rods 120a and 120b that skewer the food item. The skewer preferably has a handle 116 with hanging locator cutouts 118a, 118b and 118c, that engage the stand of the roaster in the manner described above.

In view of the above, and in accordance with the present invention, a whole chicken or other type of food item is hung upside down in an almost floating position, allowing minimal surface contact with any cooking surface or surface of the invention. This creates two unique and highly beneficial processes to take place during the cooking process. The first is that all surfaces of the food item have the ability to undergo the mallard reaction (or brown) due to the uniquely minimal surface contact with a pan or other cooking surface. Air is permitted to circulate around the food product, giving exceptionally even roasting and an overall crispy exterior. As a result, a generally uniform browning of the skin is provided. The second is that, due to the orientation of the food item, in the example of a chicken, duck or turkey, the breast part is at the lowest point, meaning all of the cooking fluids are directed to the breast, affording an incredibly moist and tender roasted food item with minimal user engagement during the cooking process.

Other benefits of the embodiment of the invention described above is flexibility in that the device may be used indoors or outdoors and in a variety of oven or grill sizes. A variety of food item sizes may also be accommodated.

While the preferred embodiments of the invention have been shown and described, it will be apparent to those skilled in the art that changes and modifications may be made therein without departing from the spirit of the invention, the scope of which is defined by the following claims.

What is claimed is:

1. A device for roasting a food item comprising:
   a. a stand adapted to be positioned on a surface of a cooking device, said stand including a first frame member and a pair of parallel side members, each of said pair of parallel side members positioned generally perpendicular to the first frame member;
   b. a food hanger configured to support a single food item and, without supporting additional food items, removably engage a top surface of the first frame member so that the single food item hangs below the first frame member between the pair of parallel side members so as to be generally suspended above the surface of the cooking device when the stand is positioned thereon.

2. The device of claim 1 wherein the first frame member is a first generally horizontal wire.

3. The device of claim 2 wherein the first generally horizontal wire includes a first hanging recess that is removably engaged by the food hanger.

4. The device of claim 3 wherein the food hanger includes a handle and a food support portion connected to the handle, said handle featuring a plurality of hanging angle locator cutouts adapted to individually engage the first hanging recess so that an angle at which the food items is suspended above the surface of the cooking device may be adjusted.

5. The device of claim 4 wherein the handle is generally arc-shaped.

6. The device of claim 4 wherein the food support portion includes a pair of arms, each of the pair of arms having a proximal end and a distal end, the pair of arms joined by their proximal ends so that the distal ends may be moved between a closed configuration where the distal ends are adjacent to each other, and an open configuration where the distal ends are spaced apart from each other.

7. The device of claim 6 wherein the proximal ends of the pair of arms are pivotally joined to the handle.

8. The device of claim 7 wherein the food hanger includes a spring urging the pair of arms into the open configuration.

9. The device of claim 7 wherein each of the pair of arms has a grasping protrusion positioned on the distal end.

10. The device of claim 4 wherein the food support portion includes a skewer.

11. The device of claim 4 further comprising a leg retention rack removably attached to the food hanger and adapted to engage a pair of legs of the food item.

12. The device of claim 1 wherein the stand includes a support and a frame that features the first frame member and a second frame member positioned generally parallel to and opposing the first frame member, said support attached to the frame between the first and second frame members.

13. The device of claim 1 further comprising a leg retention rack removably attached to the food hanger and adapted to engage a pair of legs of the food item.

14. A device for roasting a food item comprising;
   a. a stand adapted to be positioned on a surface of a cooking device, said stand including a support and a frame that features a first frame member and a second frame member positioned generally parallel to and opposing the first frame member, said support attached to the frame between the first and second frame members;
   b. a food hanger adapted to support the food item; and
   c. said food hanger removably engaging a top surface of the first frame member so that the food item hangs below the first frame member so as to be generally suspended above the surface of the cooking device when the stand is positioned thereon; and
   d. said first frame member including a first generally horizontal wire that includes a first hanging recess and said second frame member including a second generally horizontal wire that includes a second hanging recess wherein the first and second hanging recesses may be alternatively removably engaged by the food hanger.

15. A device for roasting a food item comprising:
   a. a stand adapted to be positioned on a surface of a cooking device,. said stand including a support and a frame that features a first frame member and a second frame member positioned generally parallel to and opposing the first frame member, said support attached to the frame between the first and second frame members;
   b. a food hanger adapted to support the food item; and
   c said food hanger removably engaging a top surface of the first frame member so that the food item hangs below the first frame member so as to be generally suspended above the surface of the cooking device when the stand is positioned thereon; and
   d. said stand being movable between a first configuration, where the support cooperates with the second frame member to support the stand on the surface of the cooking device so that the first frame member is generally at a first stand height, and a second configuration, where the support cooperates with the first frame member to support the stand on the surface of the cooking device so that the second frame member is generally at a second stand height, where said first stand height differs from the second stand height.

16. A device for roasting a food item comprising:
   a. a stand including a frame adapted to be positioned on a surface of a cooking device, said frame including an upper frame member;

b. a food hanger adapted to support the food item and removably engage the upper frame member so that a majority of the food item is suspended below the upper frame member and above the surface of the cooking device when the frame is positioned thereon; and c. said food hanger including a handle and a food support portion connected to the handle, said handle featuring a plurality of hanging angle locator cutouts adapted to individually engage the upper frame member so that an angle at which the food items is suspended above the surface of the cooking device may be adjusted.

* * * * *